(12) United States Patent
Maglio et al.

(10) Patent No.: US 6,744,427 B2
(45) Date of Patent: Jun. 1, 2004

(54) CHARACTER INPUT INTERFACE FOR COMPACT ELECTRONIC DEVICES

(75) Inventors: Paul Philip Maglio, Santa Cruz, CA (US); Teenie Gail Matlock, Santa Cruz, CA (US)

(73) Assignee: International Business Machines Corporation, Armonk, NY (US)

( * ) Notice: Subject to any disclaimer, the term of this patent is extended or adjusted under 35 U.S.C. 154(b) by 49 days.

(21) Appl. No.: 09/796,831

(22) Filed: Mar. 1, 2001

(65) Prior Publication Data

US 2002/0122031 A1 Sep. 5, 2002

(51) Int. Cl.[7] .................................................. G09G 5/00
(52) U.S. Cl. ...................... 345/184; 345/160; 345/169; 345/172; 341/22; 341/23; 341/35
(58) Field of Search ................................. 345/184, 160, 345/169, 172; 341/22, 23, 35; 250/463.1

(56) References Cited

U.S. PATENT DOCUMENTS 3,851,328 A    11/1974   Sottile et al. ............... 340/337
5,604,489 A *  2/1997   Hyatt, Jr. ...................... 340/5.3
6,011,542 A *  1/2000   Durrani et al. ............. 345/156

* cited by examiner

*Primary Examiner*—Richard Hjerpe
*Assistant Examiner*—Jean Lesperance
(74) *Attorney, Agent, or Firm*—Samuel A. Kassatly

(57) ABSTRACT

A rotary interface for inputting text and other information that allows the user to quickly select and input large amounts of textual information into very small devices such as cell phones, hand-held or watch-sized PDAs, or other small devices with embedded processors where standard keyboard entry is untenable and where menu-driven selection and handwriting recognition-based character entry are non-optimal. The input interface includes three main components: a rotatable character or icon display in the form of a dial, a ring or appropriate electronic display; a means of unambiguously displaying or designating the currently selected character; and an entry mechanism for inputting the character data into the memory of the electronic device.

18 Claims, 6 Drawing Sheets

CHARACTER INPUT INTERFACE FOR COMPACT ELECTRONIC DEVICES

FIELD OF THE INVENTION

The present invention relates in general to the field of data input devices, and particularly to a generalized character input interface for compact electronic devices requiring alpha-numeric inputs from the user.

BACKGROUND OF THE INVENTION

As electronic devices, such as personal digital assistants (PDAs) continue to decrease in size, proper design of the input interface for these devices becomes more important. As the space required for implementing the input interface becomes increasingly more limited, an improper design of this interface may render the electronic devices cumbersome, slow, or even unusable. For example, too many buttons on the interface may disorient an unsophisticated user. Too few keys may require that the available buttons be assigned secondary or even tertiary functions, greatly increasing the number of keystrokes and time required for even simple entries. A cumbersome layout would render the data entry slow and tedious, while tiny keys or buttons would be difficult to see and manipulate and, in addition, would require extreme precision on the part of the user.

Current personal digital assistants have mitigated these problems by incorporating a scheme that allows menu and other selections to be made by touching sensitive areas of the screen. In addition, many devices allow alphanumeric character input by means a stylus that is used to "write" on a touch-sensitive portion of the screen. The electronic device is then capable of translating the handwriting using a simplified handwriting-recognition algorithm.

These interfaces, while functional, might not represent an optimal solution that adequately addresses the rapid input of alphanumeric and other data input in miniaturized electronic devices. The need for such an input interface has heretofore remained unsatisfied.

SUMMARY OF THE INVENTION

An attribute of the present invention is to provide a rotary interface for inputting text and other information into a small electronic device. In particular, this invention allows the user to quickly select and input large amounts of textual information into very small devices such as cell phones, handheld or watch-sized PDAs, or other small devices with embedded processors where standard keyboard entry is untenable and where menu-driven selection and handwriting recognition-based character entry are non-optimal.

The foregoing and other features and advantages of the present invention are realized by an interface where alpha-numeric characters or other options, such as icons, are arranged in an optimal fashion on a physical or virtual ring or dial that can be rotated, either physically or electronically, in both a clockwise and counter-clockwise direction. The input interface is further equipped with a means of unambiguously selecting and then easily inputting the designated character into the memory of the electronic device.

The method of choosing and entering characters with a dial mechanism is particularly well-suited for inputting text in constrained contexts. An exemplary case is one of a dictionary application being executed on a watch-like electronic device. The user, using the dial and selection mechanism can rapidly enter letter into the electronic dictionary without pushing small, individual key.

A feature of the present interface is its dial layout or arrangement that allows the character of choice to be reached quickly, with bi-directional rotation. This layout ensures that, in certain embodiments, no character is more than 180 degrees from the previous selection point.

Optimal arrangement of the characters allows the user to easily and logically choose the next "value" in the input sequence. Depending on implementation details, as determined and required by the size, shape and function of the electronic device, the rotation of the dial may be achieved either with a physical/mechanical twist or rotation by the user, or by using directional electrical/electronic switches or buttons. In certain embodiments, the user may be given the option of using either the dial or the electronic switches.

Depending on the application, the characters or icons may be permanently affixed on a mechanical ring or may be displayed around the periphery of an electronic display in an arrangement customized to the task and/or possibly determined by the habits or preferences of the user. In the case of the mechanical dial, the character set is fixed at the time of manufacture. The orientation of the characters is such that they are most easily read by the user when rotated into a position for selection, typically the 12 o'clock position. Characters are selected by rotating the ring or dial in a fashion similar to that used in a combination lock.

In other embodiments, the characters are not physically imprinted on the dial mechanism, rather the dial mechanism includes a rotary display on which the characters are displayed. In these embodiments, the dial mechanism can be programmed to display the desired characters or icons. In the case of the electronic character display, the rotatable ring or dial is made separate, distinct and is unmarked. Thus, the ring or dial is simply used to scroll through and then select a specific character from a list of available inputs which are displayed on an electronic screen.

The use of the electronic display makes the character orientation significantly more versatile than the mechanical inscriptions. Consequently, each character's orientation may change for maximum legibility/readability each time the ring of characters is rotated, thus, remaining in a 12 o'clock orientation. Furthermore, characters available for selection may change according to the specific task at hand. For example, characters could be displayed on the electronic screen in any of a number of alphabet types such Roman, Arabic, Hebrew, or Cyrillic or be converted to any number of icons, numbers, etc.

A number of options are available for entering the character or icon of choice. One, which is an analog of a dial on a combination lock, allows a symbol to be entered by simply changing the direction of rotation once the character of choice has been reached. Another option is to use a button or "enter key" to signal to the electronic device that the target character has been aligned with a reference location and that the chosen character should be input into device memory.

In neither type of character entry is there a requirement that a button or key associated with a specific letter, character or icon be depressed or pushed with a finger, stylus or other tool. While the characters can be sized for legibility as well as appropriately sized to the electronic device, the selection and entry elements can be made compatible with human manipulation.

Thus, in its most basic form, the input interface comprises three main components: (1) a rotatable character or icon display in the form of a dial, a ring or appropriate electronic display; (2) a means of unambiguously displaying or designating the currently selected character; and (3) an entry mechanism for inputting the character data into the memory of the electronic device. A fourth element, a display of previously entered characters, aids in operation but is considered optional.

A number of options are available for the implementation each of these main components. Specifically, the character or icon display may be a manually or electronically rotatable ring, dial or electronic display. This may be extended to a plurality of rings, depending on the required functionality. The character selector/designator may be a simple, scribed mark on the device or an electronic display.

According to one embodiment, the entry mechanism is the reversal of the rotation direction of the ring after reaching the character of choice, in analogy with a combination lock. According to another embodiment, the character of choice is input with an "enter key." In both embodiments the character to be entered is designated unambiguously by either the alignment marker or the selection display.

The rotational character entry device of the present invention distinguishes itself over conventional devices for alphanumeric character entry for small electronic devices by its simplicity, ease of use, efficiency, and versatility. It can be easily adapted for use in most electrical and electronic control systems where small size limits the effectiveness of conventional character-entry schemes such as miniature keyboards, character recognition and menu-based systems.

BRIEF DESCRIPTION OF THE DRAWINGS

The various features of the present invention and the manner of attaining them will be described in greater detail with reference to the following description, claims, and drawings, wherein reference numerals are reused, where appropriate, to indicate a correspondence between the referenced items, and wherein:

DETAILED DESCRIPTION OF PREFERRED EMBODIMENTS

Figure 1:
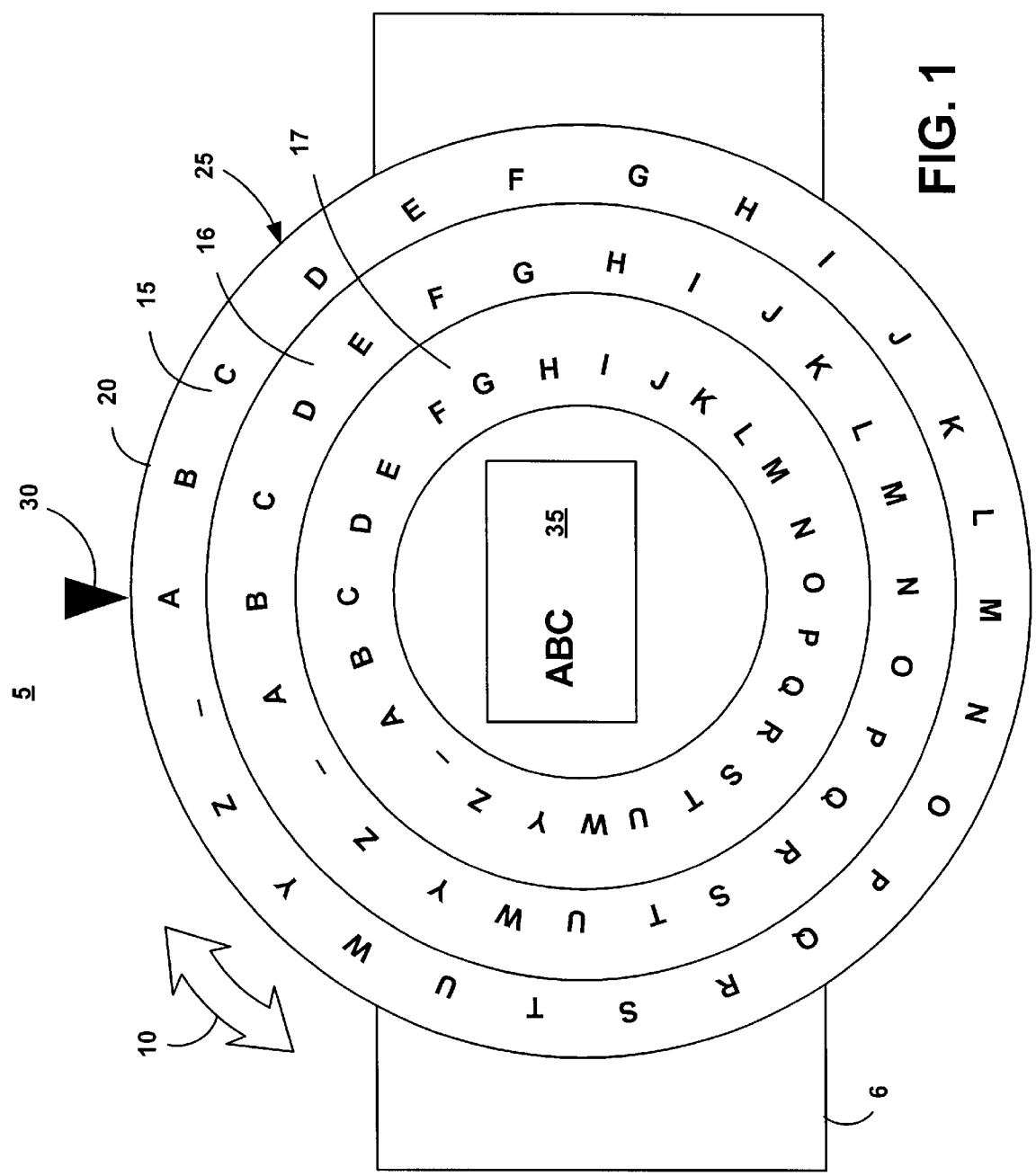
FIG. 1 is a top view of a rotary character input interface of the present invention.

FIG. 1 is a top plan view of a character input interface 5 adapted shown mounted on a compact electronic device 6. In this exemplary form, Roman letters are arranged in alphabetical order in a plurality of concentric, independently rotatable rings 15, 16, 17, on the periphery a rotatable dial mechanism 20. The dial mechanical 20 can be, for example, a ring that is rotatable in the direction of the dual-ended arrow 10. It should be clear that the character input interface 5 represents an exemplary embodiment of the present invention and should not be interpreted in a limiting sense. The quantity and types of characters may be extended to include alternate alphabets (Greek, Cyrillic, Arabic, Hebrew, etc.), symbols, control characters, numbers, icons, and various other elements that can be entered into the memory of an embedded processor.

At the 12 o'clock (top) position of the dial mechanism 20 is an alignment marker 30 which is used to designate for the user the "value" of the character that is currently available to be downloaded into the memory of the electronic device 6. In the center of the dial mechanism 20 is a display 35 that shows the characters that have previously added to electronic device memory.

As stated earlier, the dial mechanism 20 is capable of rotating in both the clockwise and counter-clockwise directions. This bi-directional rotational movement affords an easy means of inputting the selected character into memory. In particular, inputting a letter or other available character, as designated by the alignment marker 30 into memory is accomplished by simply changing the direction of the rotary dial mechanism 20.

As further illustrated in the specific embodiment of FIG. 1, the first character chosen and input into memory is selected from an outermost ring 15 engraved or otherwise inscribed with characters on the rotary dial 20. Subsequent characters, in this example, are chosen from inner rings 16, 17 that are positioned radially inward from the outermost ring 15. It should be clear that the number of rings can vary, and may range, for example, from a single ring to many rings, depending on the function of the device and the number of characters required.

In this exemplary embodiment, the arrangement of the characters is alphabetical, illustrating an additional feature of the present design, namely an easily manipulated and logical character arrangement on the rings 15, 16, 17. This allows letters to be selected and input in rapid succession by the user. The rings 15, 16, 17 are easily rotated by the user, and the letters are readily place into electronic device memory. An important feature of this embodiment is that at no point is the user required to push or depress small keys associated with the individual characters.

The alignment marker 30 is used to designate, in an easily observable and unambiguous fashion, the character selected for input into device memory. In this exemplary case, a simple scribed or marked arrow is utilized as a marker, though this could be replaced by an electronic or mechanical display for the selected character. The placement of the alignment marker 30 is driven by its need to provide ready and accurate information for the user. In this design, the 12 o'clock position has been advantageously chosen as the most easily read and most intuitive of the various locations.

An electronic display 35 is disposed at the center of the rotary character input interface 5, for displaying to the user characters that have been previously added to memory. The orientation of the display 35 is preferably adjusted with the orientation of the alignment marker 30, though other orientations can be contemplated as well.

This method of dialing and inputting the characters is particularly well-suited to text input in constrained contexts. An exemplary case is one in which a dictionary application is "running" on an embedded processor. To look up a word, the users begins to input letters. After the first few letters, the number of possibilities decreases to the point where the user can choose from a small, drop-down list, accessed via the rotary dial 20.

Figure 2:
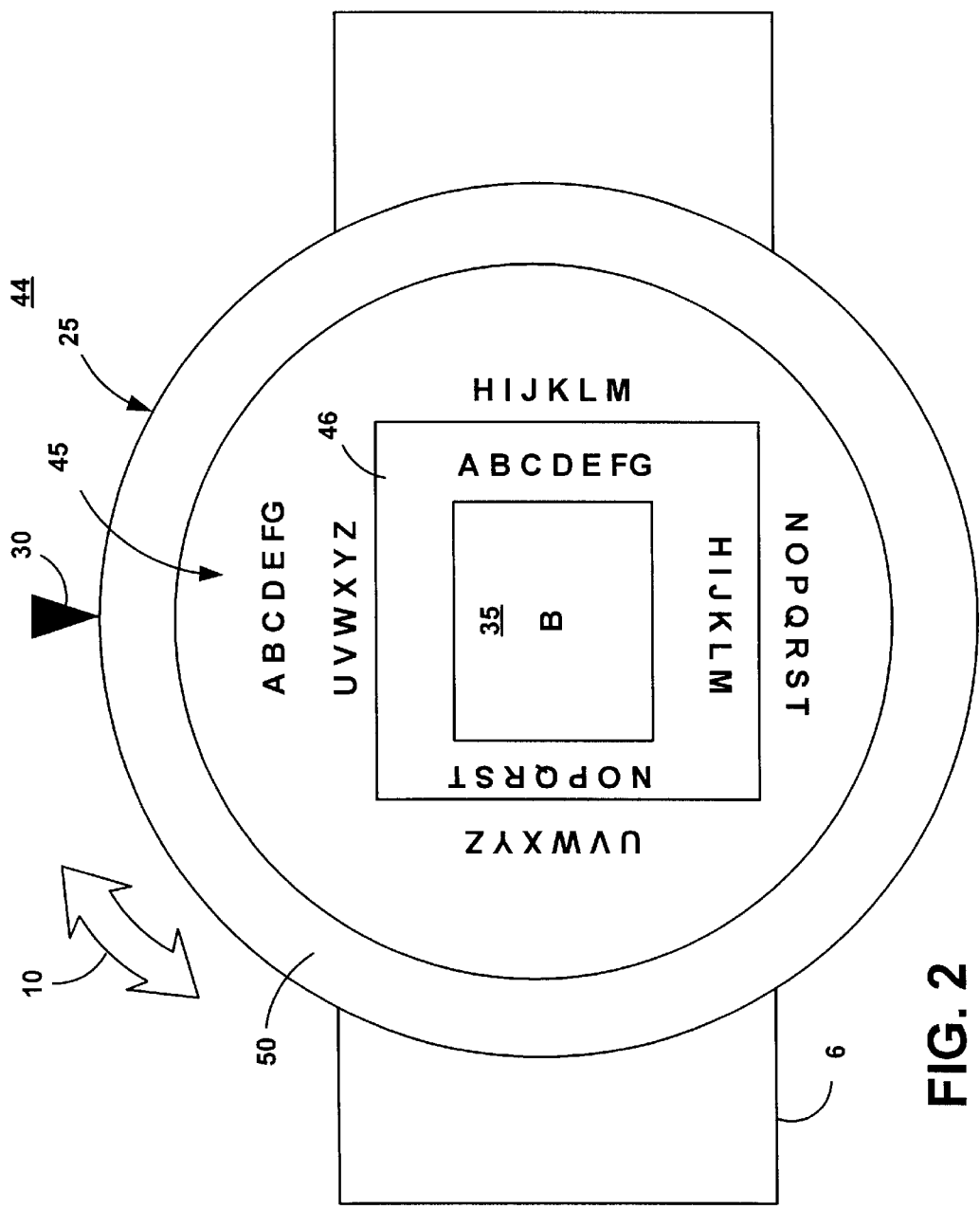
FIG. 2 is a top view of an alternative character input interface of the present invention.

FIG. 2 illustrates another character input interface 44 that has the characters arranged, not in a circular fashion, but in the form of a plurality of embedded rectangles (or square) dials 45, 46 that are surrounded by a rotary selector 50. The rotary selector 50 is devoid of character data and is capable of bi-directional movement along the direction of the arrow 10.

Characters 25 within the dials 45, 46 may be inscribed in a rotating mechanical disk or displayed electronically. The shape of the dials, and the arrangement of the characters 25 or other selections (such as icons) can be arranged to suit the needs or habits of users or to facilitate the ease of use of the electronic device. As an example, the most commonly used characters may be arranged in a group to minimize the time and effort required for their selection.

The dials 45, 46 may be rotated in both clockwise and counter-clockwise directions by means of the rotary selector 50 to select a given character. The selected character is designated by the alignment marker 30, and the character is once again entered into the device memory by reversing the direction of rotation of the rotary selector 50.

This embodiment illustrates the feature that characters need not be physically united with the rotary device but may be displayed separately with the rotary selector 50 and simply used to rotate and select the characters of choice. The display 35, in the center of the electronic device presents to the user the characters that have previously been entered into the device memory.

Figure 3:
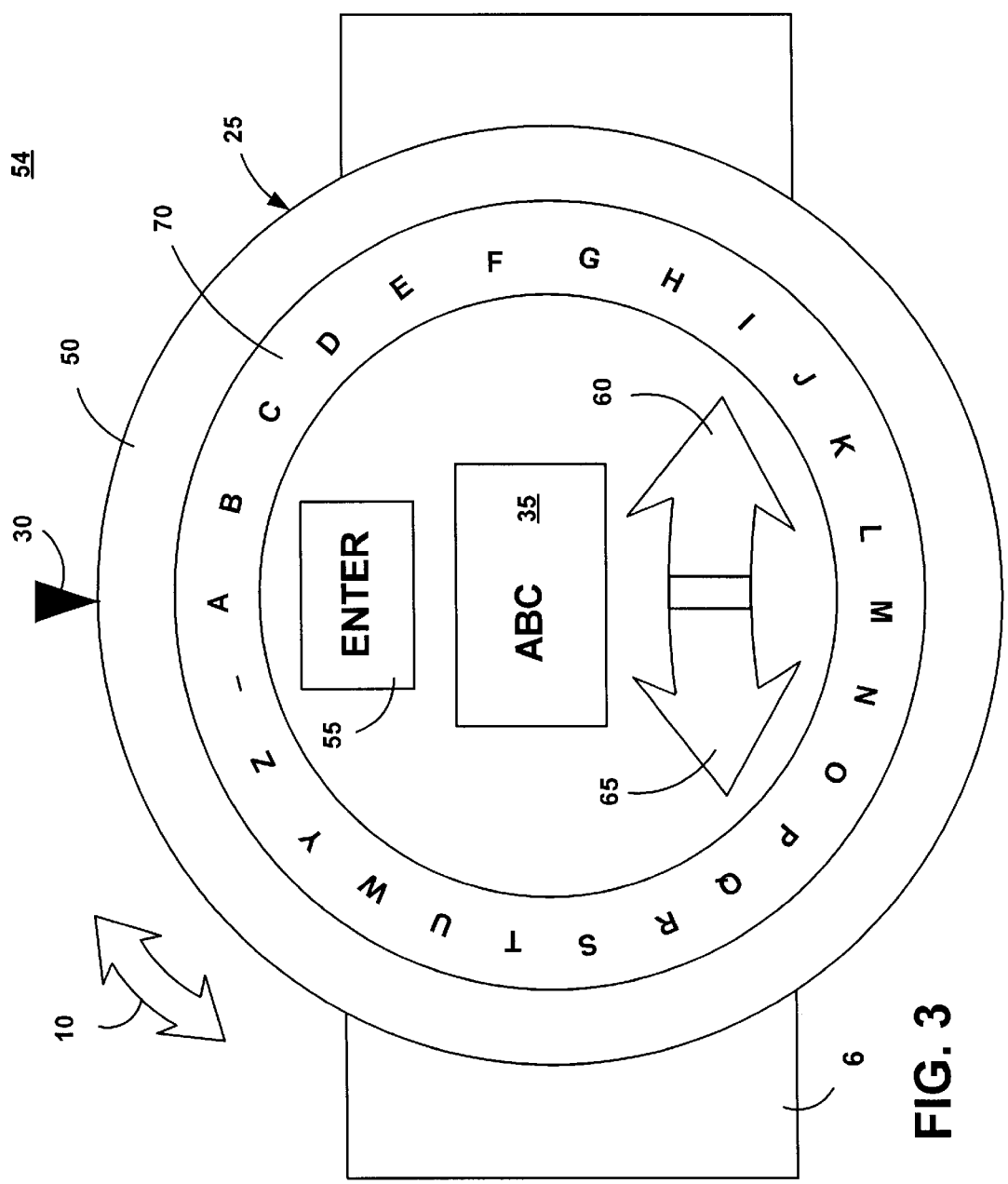
FIG. 3 is a top view of the of the character input interface of FIG. 1 in use for loading character data into an electronic device memory.

FIG. 3 illustrates another character input interface 54 that includes a single ring 70 on which the characters or letters 25 are arranged in alphabetical order around the periphery of the ring 70. The characters 25 are oriented to be displayed in an upright or 12 o'clock orientation while positioned under the alignment marker 30. While only alphabetic characters and a character corresponding to a "space" or "dash" are displayed, it should be understood that the number of characters may be changed to suit the requirements of the electronic device 6.

In this embodiment, the ring 70 may be displayed in electronic form and the rotation of the ring of characters is achieved by depressing one of two buttons, a clockwise rotation button 60 or a counter-clockwise button 65. Once the letter of choice rotates into position as designated by the alignment marker 30 the enter key 55 is depressed to input the value into memory. The size of the enter key 55, clockwise rotation button 60 and counter-clockwise button 65 are sufficiently large to allow easy manipulation by the user. As described in conjunction with other embodiments, previously entered characters are displayed in the display area 35.

In one embodiment, the ring 70 is an electronic display and does not rotate, thus forming what is referred to herein as "an electronic ring". In that embodiment, the rotary selector 50 may be replaced by a switch whereby holding the switch "rotates" the characters on the "electronic ring." This switch might also have two "on" positions, right and left corresponding to clockwise and counter-clockwise rotation respectively. In another embodiment, the rotary selector 50 is included to complement (or supersede) the electronic rotation action of the electronic ring.

Figure 4A:
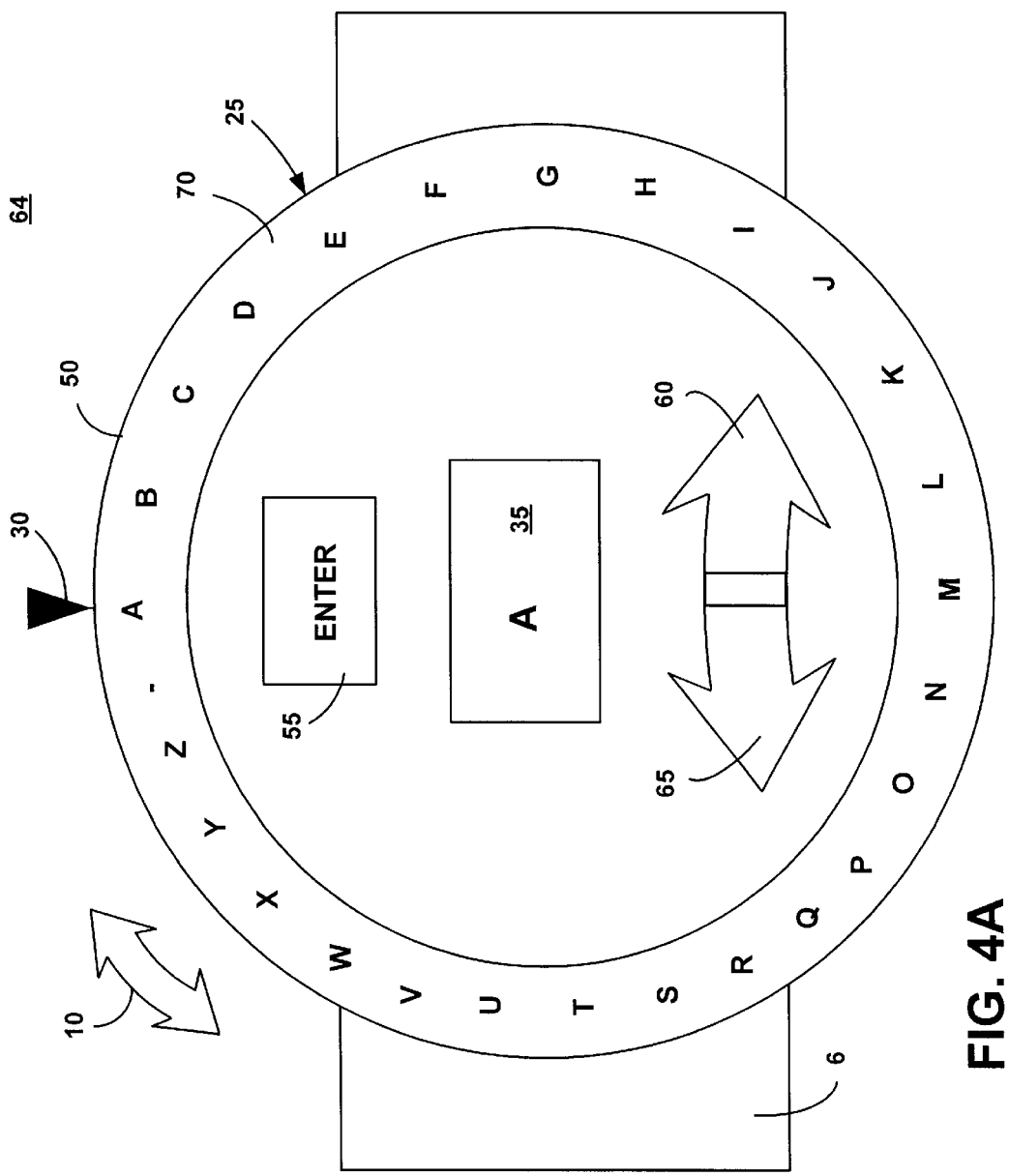
FIG. 4 is comprised of FIGS. 4A and 4B, and is a top view of the rotary character input interface of FIG. 1 in using an electronic character display.
Figure 4B:
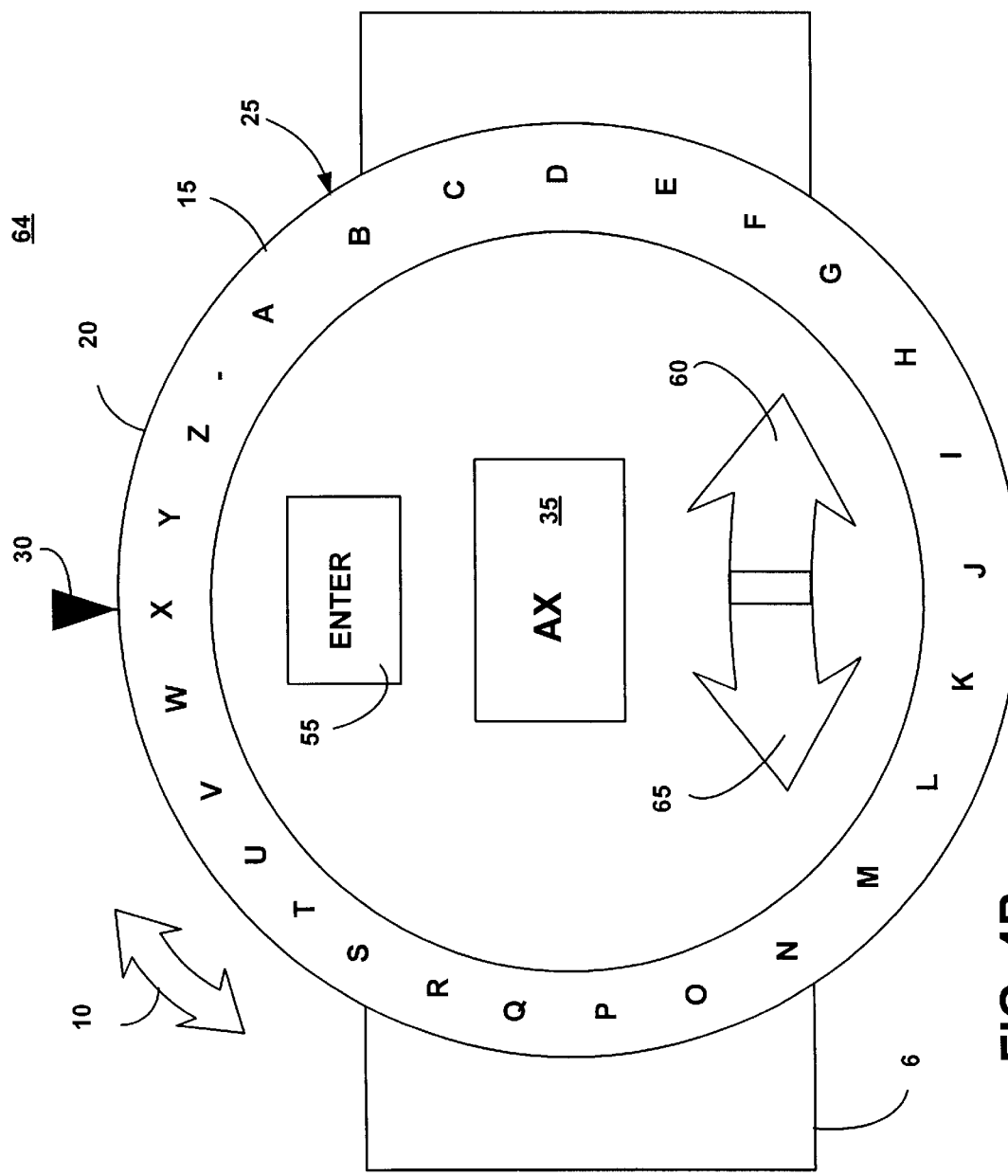

FIGS. 4A and 4B illustrate the advantages of an electronic display for characters in an implementation similar to that described in conjunction with FIG. 3. In FIG. 4A, the characters 25 are all oriented vertically, that is, in the 12 o'clock position, and form a ring 70 around the periphery of a rotary character input interface 64. The flexibility of the electronic display allows the characters 25 to remain vertical and, thus, easily read, even when the ring 70 is rotated to a new position to select a new character.

FIG. 4A depicts the letter "A" as being the input choice, and FIG. 4B displays the letter "X" as the next character of choice. All the characters 25 remain in the vertical position around the periphery of the ring 70. In contrast, the relative orientation of the characters 25 of the displays of FIGS. 1, 2 and 3 changes as the ring or rings are rotated, making it less easy to read than those characters that are not near the alignment marker 30.

The advantages of the character input interface 64 may be realized in a situation where the ring 70 contains less familiar elements, such as icons that could be less recognizable when oriented differently. The letters that have been previously entered into the device memory are displayed in the display area 35. These letters (or characters) are entered into the device memory by means of an "Enter" key 55.

Figure 5:
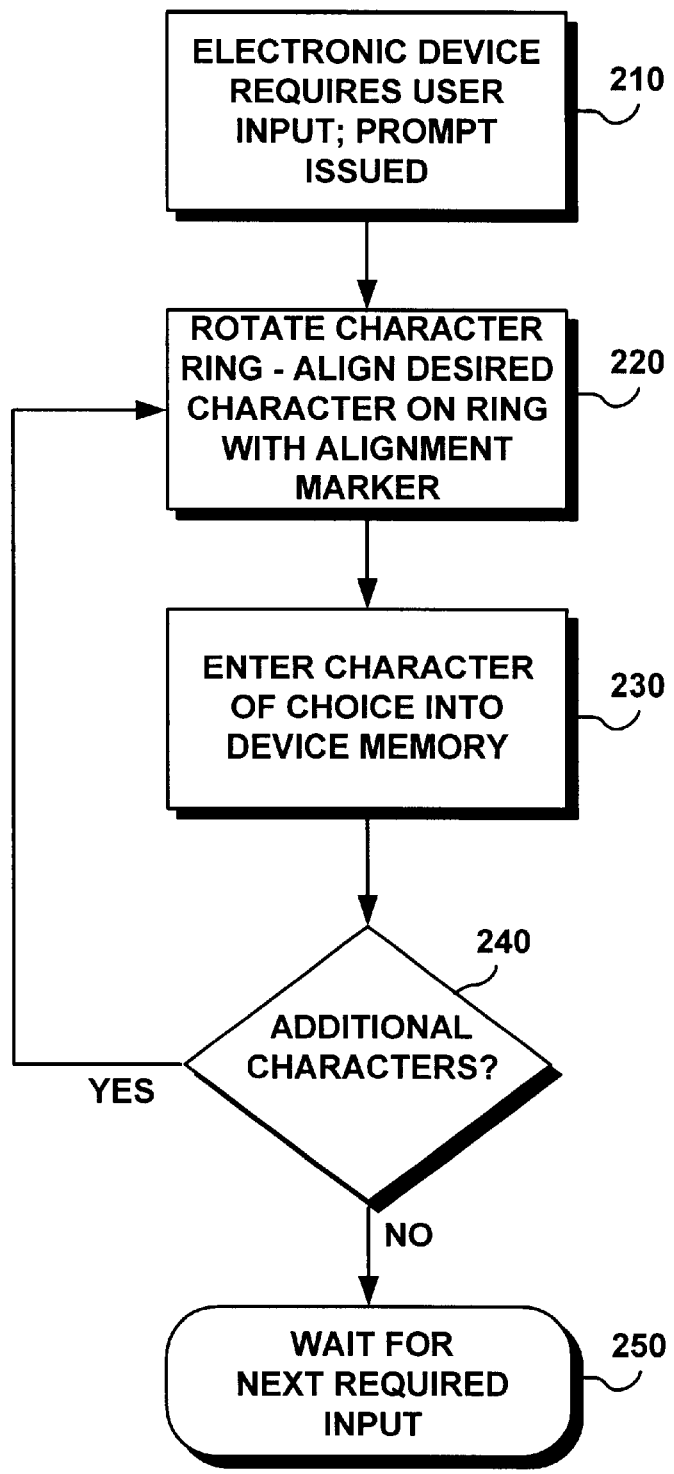
FIG. 5 is a functional flowchart that illustrates a method of using the character input interfaces of FIGS. 1 through 4.

In use, and as illustrated by method 200 in FIG. 5, with the rotary character interfaces 5, 44, 54, 64 operational, the embedded processor of the electronic device 40 reaches a point in the execution of its software where used input is required. A prompt is issued for the user as indicated at step 210. The user, choosing to respond, begins to select the appropriate character data, as discussed earlier in conjunction with FIGS. 1 through 4B. To effectuate this selection, the user rotates the character ring or rings 15, 16, 17, 60, at step 220, to align the desired character with the alignment marker 30.

Once the appropriate character is selected, this character is added to the device memory with an entry operation at step 230. Depending on the implementation of the particular electronic device 40, this may be effected by reversing the rotational direction of the dial (FIGS. 1 and 2), or by pressing the Enter key (FIGS. 3 and 4).

A decision occurs at step 240 wherein the user decides whether or not to enter an additional character 25. If the user elects to enter an additional character 25, the method 200 returns to step 220 and the user completes the character input. Otherwise, if the user does not wish to enter an additional character 25, the method 200 proceeds to step 250 where the character input interface awaits additional character data input or proceeds to a subsequent operation step.

It is therefore apparent that the character input interfaces of the present invention offer several advantages. For example, the rotary character input device provides a clear, simple and superior means of inputting alphanumeric or other discrete character information into the memory of small electronic devices such as PDAs or cell phones where other input mechanisms, such as keyboards, are limited in scope and utility. The rotary nature of the invention affords rapid transition between characters with relatively little angular rotation. Character selection is unambiguous, due to the inclusion of an alignment marker 30.

In addition, the design of the input character interfaces is intuitive and easily manipulated, requiring little practice on the part of the user. This may be compared to PDAs where a simplified alphabet must be learned. Characters 25 can be arranged according to the requirements of the electronic device 6 and, if displayed in electronic form as shown in FIGS. 2, 3 and 4, can be customized to fit the user's habits or individual needs. This customization feature greatly increases the efficiency of the electronic device 40.

Moreover, individual character keys are not required to be depressed, obviating the need for specialized tools or precise finger-strokes. When implemented, the Enter and direction buttons can be made large enough to be readily manipulated by the largest hands or by those with limited motor skills. In the case where the analogy of the combination lock applies for character input, the rotary mechanism is large, easily manipulated, unambiguously aligned by means of an alignment marker 30 and, thus, precisely and easily operated.

The addition of a display area 35 gives the user the added advantage of viewing previous inputs, limiting the number and incidence of mistakes and increasing the ease and efficiency of use.

It is to be understood that the specific embodiments of the invention that have been described are merely illustrative of certain application of the principle of the present invention. Numerous modifications may be made to the rotary character input device described herein without departing from the spirit and scope of the present invention. For example, while the embodiments of the rotary character input interfaces have been displayed with characters of the Roman alphabet, the character set may be extended to other alphabets, to icons and other sets of discrete characters.

In addition, while the input character interfaces have been described in conjunction with small electronic devices, their scope could be readily expanded to include mechanical devices and larger electronic gear such as portable communication devices for the deaf. Whereas the character input device has been shown to include 1, 2 or 3 concentric character sets, the number of character sets can be expanded/decreased according to function and the particular arrangement customized to the function of the electronic device in question. The shape of the dial mechanism is not necessarily circular as illustrated in the drawings, but could rather assume different shape, for example rectangular, square, triangular, and so forth.

Moreover, while the system has been described in connection with alphanumeric data entry, it should be clear that the present invention may also be used for text entry of a logographic based language in which a symbol represents a word or a phrase. As a result, a "character" could include an alphanumeric character, an icon, or any other designation or symbol.

What is claimed is:

1. A data input interface for fast selection and input of information, comprising:
   a dial mechanism that displays a plurality of selectable characters;
   the dial mechanism is capable of moving in a bi-directional, combination lock-like rotation, for enabling the selection of characters;
   a display that displays currently selected characters;
   a memory for storing the currently selected characters; and
   wherein a selection of the characters is effected by changing the direction of rotation of the dial mechanism once a character of choice has been reached.

2. The data input interface of claim 1, wherein the dial mechanism is rotatable at least 180 degrees in a clockwise direction and at least 180 degrees in a counterclockwise direction.

3. The data input interface of claim 2, wherein the dial mechanism includes a rotatable ring.

4. The data input interface of claim 3, wherein the dial mechanism includes a plurality of concentric, rotatable rings.

5. The data input interface of claim 3, wherein the dial mechanism further includes an electronic ring.

6. The data input interface of claim 1, further including a single entry key for enabling the selection of characters.

7. The data input interface of claim 6, wherein the single entry key is an "enter key".

8. The data input interface of claim 1, further including a reference location with which the character of choice is aligned for selection.

9. The data input interface of claim 1, wherein the selectable characters include alpha-numeric characters.

10. The data input interface of claim 1, wherein the selectable characters include icons.

11. The data input interface of claim 1, wherein the selectable characters include symbols.

12. The data input interface of claim 11, the symbols represent text entry of a logographic based language.

13. The data input interface of claim 1, wherein the selectable characters are permanently affixed on a mechanical ring.

14. The data input interface of claim 1, wherein the selectable characters are displayed around a periphery of an electronic display in a customized arrangement.

15. The data input interface of claim 1, wherein the dial mechanism comprises a rectangularly shaped dial.

16. The data input interface of claim 15, wherein the dial mechanism comprises a plurality of concentrically arranged, rectangularly shaped dials.

17. The data input interface of claim 1, wherein the dial mechanism comprises a square shaped dial.

18. The data input interface of claim 17, wherein the dial mechanism comprises a plurality of concentrically arranged, square shaped dials.

* * * * *